No. 837,865. PATENTED DEC. 4, 1906.
H. W. MORGAN.
VULCANIZING PROCESS.
APPLICATION FILED NOV. 23, 1905.
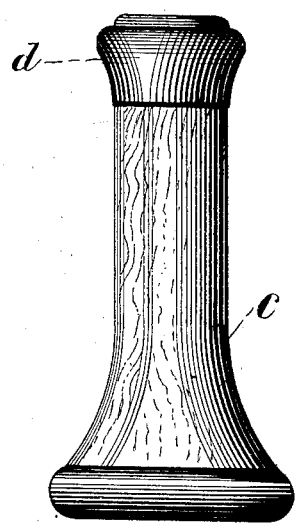
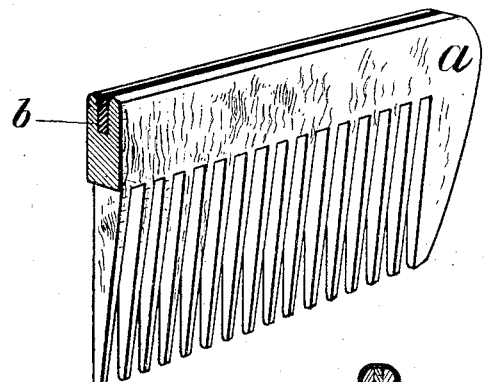
WITNESSES:
John J. Kittle
Walton Harrison
INVENTOR
Hubert W. Morgan
BY
ATTORNEYS

UNITED STATES PATENT OFFICE.

HUBERT W. MORGAN, OF CLEVELAND, OHIO.

VULCANIZING PROCESS.

No. 837,865.  Specification of Letters Patent.  Patented Dec. 4, 1906.

Application filed November 23, 1905. Serial No. 288,706.

*To all whom it may concern:*

Be it known that I, HUBERT W. MORGAN, a citizen of the United States, and a resident of Cleveland, in the county of Cuyahoga and State of Ohio, have invented certain new and useful Improvements in Vulcanizing Processes, of which the following is a full, clear, and exact description.

My invention relates to vulcanizing, my more particular object being to apply the vulcanizing material to comparatively pliable substances such as would ordinarily be destroyed by the heat of vulcanization. I especially desire to apply a plastic material to particles of wood, paper, and the like and so vulcanize the plastic materials as to avoid injury upon the objects to which they are thus applied.

In carrying out the objects above stated I take rubber, gutta-percha, or other vulcanizable compound, dissolve the same so as to reduce it to a liquid or plastic condition, admix it with sulfur or subject it to the action of some other vulcanizing agent, incorporate in it clay, whiting, metallic oxids, old or reclaimed rubber, gum pontianak, and the like. I then apply the compound thus formed to the object to be treated, and finally heat the same to a comparatively low temperature for a short time, which finishes the vulcanization. It is well known that rubber, gutta-percha, and other vulcanizable materials may be dissolved in chloroform, bisulfid of carbon and other solvents and that they may then be admixed with any ordinary alloy employed in this art. After this in my process the admixture receives an additional step of treatment not heretofore employed to my knowledge in the art. I subject the admixture to the action of ozone. I find that ozone is much more effective for oxidizing the admixture than is the ordinary oxygen of the air sometimes used for this purpose.

I find that vulcanizable substances, such as rubber, when thus treated are rendered exceedingly adhesive to non-metallic surfaces. Treated in this manner the plastic mass in being thus formed requires considerably less time and only a small proportion of the degree of heat generally required for complete vulcanization. I find, too, that after vulcanization in this manner the hardness of the completed substance is equal to that of the highest grade of ordinary hard rubber and that the finished substance is capable of receiving a fine and brilliant polish.

Reference is to be had to the accompanying drawings, forming a part of this specification, in which similar characters of reference indicate corresponding parts in all the figures.

Figure 1 is an elevation of a telephone-receiver treated in accordance with my invention. Fig. 2 is a perspective view, partly in section, of a comb-frame provided with a strengthening-rib and ready to receive a coating of vulcanizable material; and Fig. 3 is a cross-section through the finished comb after the latter receives its coating of vulcanizable material.

The back of the comb is shown at $a$ and is provided with a kerf $b$, which is filled with plastic vulcanizable material, such as rubber or gutta-percha. After the vulcanization is completed, as hereinafter described, the material filling the kerf acts as a stiffening-rib and greatly strengthens the comb. By this means the frame of the comb may be made of wood, the grain running crosswise of the general length of the frame, as indicated in Fig. 2, yet the frame as a whole giving the comb sufficient strength for ordinary use. If preferred, the kerf $b$ may be filled by a strip of wood the grain of which runs lengthwise of the comb. After the comb-frame is completed, as indicated in Fig. 2, it receives a coating or covering $e$ of vulcanizable material. It is then ready to be placed in the vulcanizer, as hereinafter described. In the telephone-receiver the casing $c$ is made of wood and the vulcanizing material is shown at $d$.

The articles being prepared as above described are placed in a vulcanizer and subjected to a low degree of heat for a comparatively short time, after which they are removed. As above indicated, the temperature need not be high enough to cause the wood to change color or to become weakened or even to warp. Because of the low heat employed paper, leather, and many other substances besides wood may be effectively vulcanized. Before vulcanization the articles may be given fine smooth surfaces and then treated to a coating of the compound above described. The coating may be comparatively thin. If desired, the articles after removal from the vulcanizer may be treated with a second or third coating and replaced in a vulcanizer, so that several concentric coatings of the vulcanized material may be formed.

Having thus described my invention, I claim as new and desire to secure by Letters Patent—

The method herein described of vulcanizing, which consists in dissolving rubber, gutta-percha or the like in a solvent fluid, adding sulfur to said fluid, subjecting said fluid to the action of ozone, and finally vulcanizing said fluid.

In testimony whereof I have signed my name to this specification in the presence of two subscribing witnesses.

HUBERT W. MORGAN.

Witnesses:
ALLAN T. BRINSMADE,
FRANK E. MINTER.